Dec. 31, 1929. T. ANTOINE 1,741,447
CARBURETOR FOR INTERNAL COMBUSTION ENGINES
Filed Feb. 27, 1926

Inventor,
Tony Antoine,
By Emil Bönnelycke
Atty.

Patented Dec. 31, 1929

1,741,447

UNITED STATES PATENT OFFICE

TONY ANTOINE, OF BRUSSELS, BELGIUM

CARBURETOR FOR INTERNAL-COMBUSTION ENGINES

Application filed February 27, 1926, Serial No. 91,138, and in Belgium March 5, 1925.

The present invention relates to carburetors for internal combustion engines, and is particularly applicable to carburetors provided with a passage through which the fuel is drawn into a chamber wherein it is mixed with air and wherein a needle valve disposed in line with the axis of the said passage controls the section of the outlet orifice thereof.

The main object of the invention is to produce thorough mixing of the constituents of the explosive mixture by effecting diffusion of the liquid fuel in such a way as to avoid incomplete combustion and deposits of drops of fuel on the walls and in the passages of the induction pipe of the engine. For this purpose, the fuel is subjected to a gyratory movement producing eddying and whirling in the mixing chamber, thereby promoting complete atomization of the fuel and admixture with the air. The gyratory movement is obtained by one or more grooves forming passages for the fuel and which may be located either in the outer surface of the needle valve or in the inner surface or wall of a cap or sleeve that surrounds the needle and to which the latter is secured, the first-mentioned arrangement being preferred. The grooves are inclined relatively to the axis of the member wherein they are formed, and they may, with advantage, be of helicoidal shape.

A further object of the invention is to admit secondary air to travel to an emulsifying chamber in substantially the opposite direction to the fuel discharged through the outlet orifice of the fuel passage; this chamber being located between and communicating with the said orifice and the inlet ends of the grooves. The invention also provides means whereby the admission of the secondary air and of the fuel can be controlled separately and at a distance.

According to the invention, the mixture of secondary air and fuel, on leaving the emulsifying chamber, enters the afore-mentioned grooves and is subjected therein to a gyratory motion which produces, at the outlet from said grooves, whirling movements in the mixing chamber where the mixture meets the main or primary air. Control of the fuel supply may be effected by raising or lowering the needle, while the secondary air supply may be regulated by the rotation of a suitably apertured ring which coacts with the inlet for the air.

Figure 3:
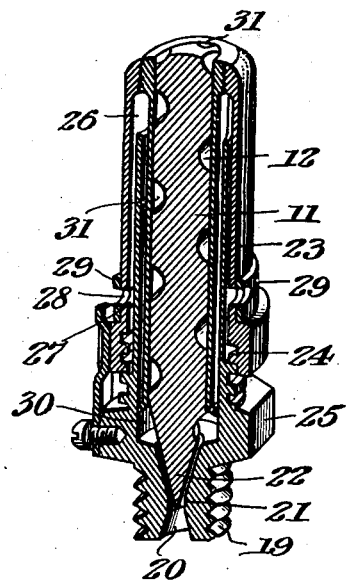
Fig. 3 is a view similar to Fig. 2, but with the addition of means for adjusting the cross-sectional areas of the inlets for the fuel and air.

In the carburetor illustrated the fuel tank 1 which contains a float 2, is connected by a duct 44 to a fuel inlet passage 20 which is surmounted by a sleeve-like cap 23, in the axial bore 31 of which the needle 11 is arranged the main or primary air being admitted at 6 to the carburetor. The wall or surface of this bore is formed with helicoidal grooves 12' for subjecting the fuel, which must pass therethrough when it is sucked in by the engine, to a whirling movement; and these grooves 12' are of increasing depth from their point of origin to their upper ends where they open into the mixing chamber 5. The said chamber opens into the induction pipe which is fitted with a throttle valve 45 for controlling the suction. The cap 23 is represented in detail in Figs. 2 and 3 in which, however, the grooves 12' formed in the wall of the bore 31 of the cap are replaced by grooves 12 formed in the surface of the needle.

Figure 1:
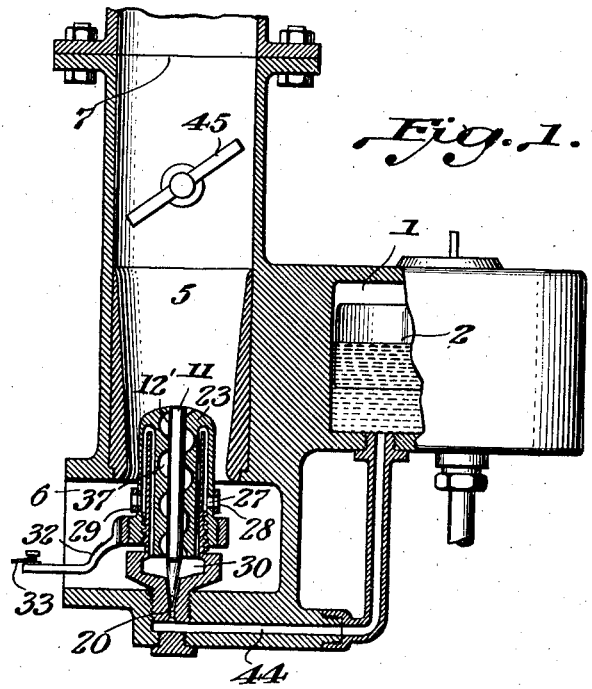
Fig. 1 is a vertical section of a carburetor embodying the invention and in which the grooves are situated in the inner wall of the cap that surrounds the needle.

The figures last mentioned show the fuel passage 20 formed in the threaded part 19 of a stationary member 25, which part 19 is adapted to be screwed into an opening in the bottom wall of the carburetor casing (see Fig. 1); the outlet orifice 21 of said passage 20 being more or less closed by the point 22 of the needle, which latter is secured to the cap 23 in some suitable manner. The lower portion of the cap is provided with an internal thread 24 of square section which is engaged with a complemental thread formed externally on the upper portion of the stationary member 25, so that by turning the cap it will be caused to move up or down according to the direction of rotation, carrying the needle with it in its movement. This may be effected, for example, by means of an arm 32 (Fig. 2) secured to the lower part of the cap and operated by a cable 33 which leads from a pin 34 fixed to the outer end of the arm to an actuating device subsequently described; the return movement of the arm being obtained by a retractile coil spring 35 attached at one end to pin 34 and at the other end to a stationary pin 36.

To admit the supply of secondary air to the bore 31 of the cap and to the grooves 12 (or 12′) for admixture with the fuel, passages 26 are provided in the body of the cap which communicate with the outside by way of lateral ports 27 and 28 formed, respectively, in the cap and in a ring 29 encircling the same. The ring can be turned relatively to the cap so as to vary the extent of registration of said ports and, hence, the quantity of air admitted. The passages 26 open at their lower ends into an emulsifying chamber 30, which is located intermediate the fuel passage 20 and the lower ends of the grooves 12 (or 12′) and the cap bore 31 and is in open communication with the same. Due to this arrangement, the secondary air admitted through ports 28 and 27 and passages 26 will pass into chamber 30, where it will meet the fuel entering said chamber through passage 20 and its outlet orifice 21, with the result that an emulsifying action will take place in the chamber, the emulsion then entering and passing through the grooves wherein it undergoes a preliminary or partial atomization which is completed in the mixing chamber 5 by the main or primary air.

Figure 2:
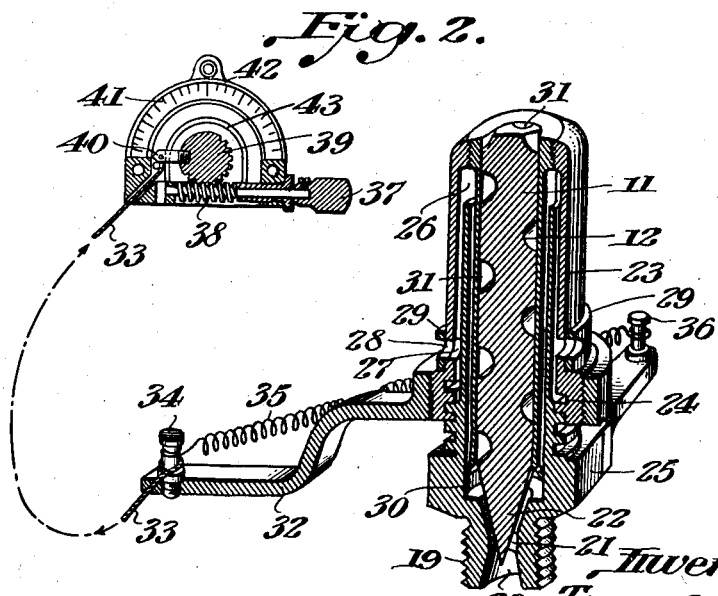
Fig. 2 is an enlarged section of the device represented in Fig. 1, but showing the grooves formed in the needle.

The device for actuating the cable 33 may comprise, as shown in Fig. 2, a rotary shaft or handle 37 provided with a worm 38 which meshes with and rotates a worm wheel 39. This wheel 39 is equipped with a pointer 40 for cooperation with a scale or dial 41 having graduations 42 marked on it, and to said wheel there is rigidly connected a drum 43 whereto the cable is fastened, so that the rotation of shaft 37 and consequent turning of the drum will act to wind up the cable, with the result that the arm 32 is actuated and, in turn, actuates the cap 23; the pointer 40 indicating on the scale the extent of such actuation.

The invention, as described above and as hereinafter claimed, is not limited to the particular type of carburetor illustrated but is applicable in general to all vertical or horizontal carburetors provided with a passage or orifice for supplying fuel to a mixing or carbureting chamber. The construction and mounting of the needle valve and the accessibility of the controlling members according to the particular shape and arrangement of the component elements of the carburetor do not involve any difficulty in practice and may be varied, from a purely constructional view, without departing from the scope of the invention.

I claim as my invention:—

1. In a carburetor, a fuel reservoir; a fuel passage in communication therewith and opening into a mixing chamber; a movable needle valve disposed in line with the axis of the fuel passage at the outlet thereof and projecting at its point into the outlet orifice thereof to adjust the effective cross-sectional area of said orifice; said needle being provided on its outer surface with a groove which extends from its point along its length for a considerable distance and which is inclined relatively to the axis of the needle, such groove having a cross-section of sufficient depth to give passage to the fuel drawn through the aforesaid outlet orifice; and a movable cap surrounding said needle and its groove to permit the fuel to follow the latter, said cap having the needle secured to it to cause movement of the two in unison.

2. In a carburetor, a fuel reservoir; a fuel passage in communication therewith; a movable needle valve disposed in line with the axis of the fuel passage and projecting at its point into the outlet orifice thereof to adjust the effective cross-sectional area of said orifice; said needle being provided on its outer surface with inclined grooves which extend from its point along its length for a considerable distance and which have a cross-section of sufficient depth to give passage to the fuel drawn through the aforesaid outlet orifice; an emulsifying chamber intermediate said orifice and the inlet end of the grooves and into which the former opens; and means for admitting secondary air to travel to the emulsifying chamber in substantially the opposite direction to the fuel discharged through the fuel orifice.

3. In a carburetor, a fuel reservoir; a fuel passage in communication therewith; a movable needle valve disposed in line with the axis of the fuel passage and projecting at its point into the outlet orifice thereof to adjust the effective cross-sectional area of said orifice; said needle being provided on its outer surface with inclined grooves which extend from its point along its length for a considerable distance and which have a cross-section of sufficient depth to give passage to the fuel drawn through the aforesaid outlet orifice; an emulsifying chamber intermediate said orifice and the inlet end of the grooves and into which the former opens; means for admitting secondary air to travel to the emulsifying chamber in substantially the opposite direction to the fuel discharged through the fuel orifice; and separate means for adjusting the needle and the secondary air supply means to control the delivery of the fuel and air to said chamber.

4. In a carburetor, a fuel reservoir; a fuel passage in communication therewith; a movable needle valve disposed in line with the axis of the fuel passage and projecting at its point into the outlet orifice thereof to adjust the effective cross-sectional area of said orifice; said needle being provided on its outer surface with inclined grooves which extend from its point along its length for a considerable distance and which have a cross-section of sufficient depth to give passage to the fuel drawn through the aforesaid outlet orifice; a rotatable sleeve-cap through which the needle extends axially and to which it is secured, an emulsifying chamber intermediate the outlet orifice and the inlet ends of the grooves and communicating with the same; means to rotate said cap and thereby adjust the needle; and means for admitting secondary air to travel to the emulsifying chamber in substantially the opposite direction to the fuel discharged through the fuel orifice.

5. In a carburetor, a fuel reservoir; a fuel passage in communication therewith; a movable needle valve disposed in line with the axis of the fuel passage at the outlet thereof and projecting at its point into the outlet orifice thereof to adjust the effective cross-sectional area of said orifice; a rotatable sleeve-cap surrounding the needle and to which the latter is secured, said cap and needle constituting companion elements one of which is formed with inclined surface grooves of considerable extent having a cross-section of sufficient depth to give passage to the fuel drawn through the aforesaid outlet orifice; an emulsifying chamber intermediate said orifice and the inlet ends of the grooves and communicating with the same; and means for admitting secondary air to travel to the emulsifying chamber in substantially the opposite direction to the fuel discharged through the fuel orifice.

6. In a carburetor, a fuel reservoir; a fuel passage in communication therewith; a movable needle valve disposed in line with the axis of the fuel passage at the outlet thereof and projecting at its point into the outlet orifice thereof to adjust the effective cross-sectional area of said orifice; a rotatable sleeve-cap surrounding the needle and to which the latter is secured, said cap and needle constituting companion elements one of which is formed with inclined surface grooves of considerable extent having a cross-section of sufficient depth to give passage to the fuel drawn through the aforesaid outlet orifice; an emulsifying chamber intermediate said orifice and the inlet ends of the grooves and communicating with the same; means for admitting secondary air to travel to the emulsifying chamber in substantially the opposite direction to the fuel discharged through the fuel orifice; and separate means for adjusting the needle and the secondary air supply means to control the delivery of the fuel and air to said chamber.

In testimony whereof I affix my signature.

TONY ANTOINE.